United States Patent Office 3,107,565
Patented Oct. 22, 1963

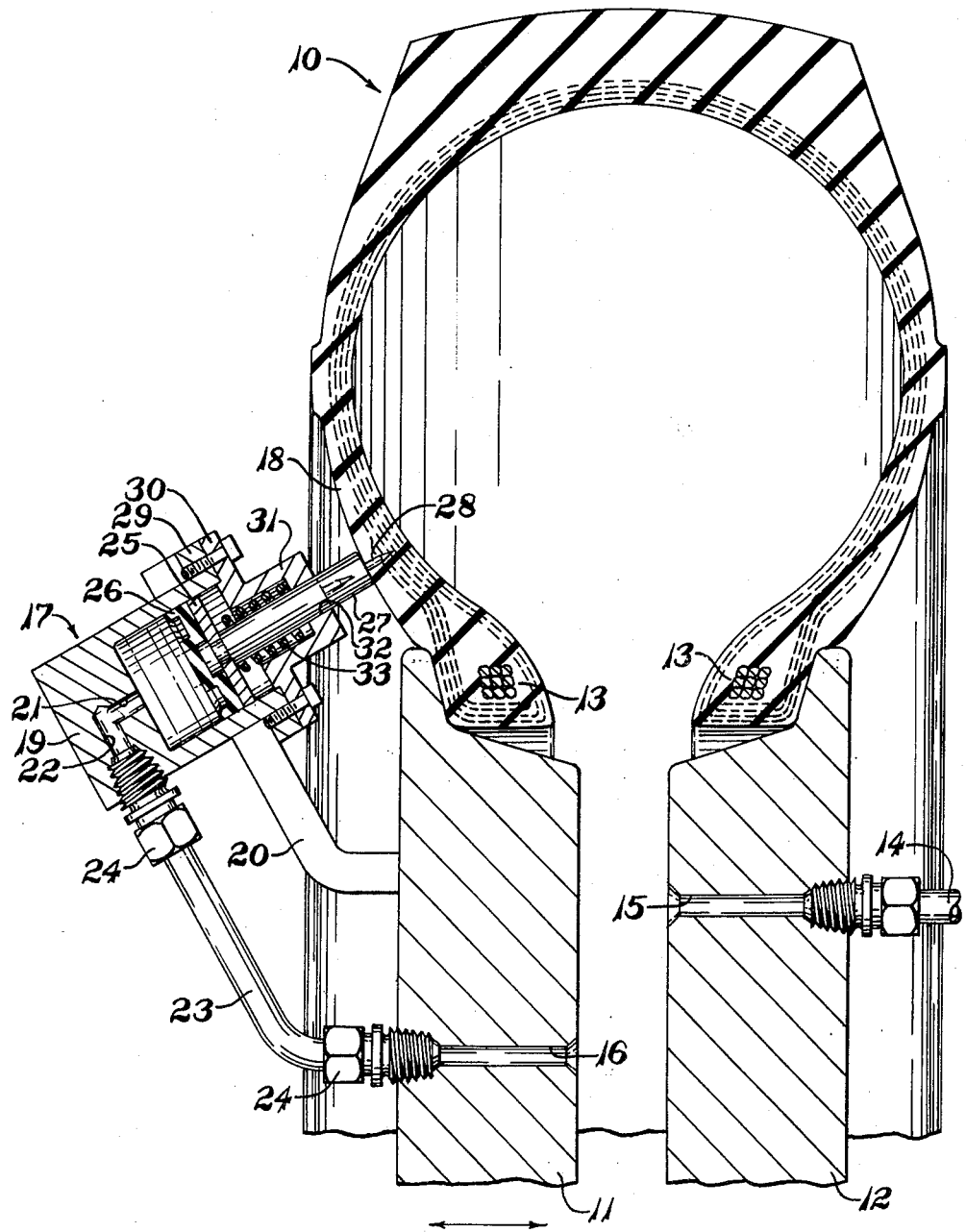

3,107,565
TIRE PIERCING APPARATUS
Otto E. Hermanns, Akron, Ohio, assignor to The B. F. Goodrich Company, New York, N.Y., a corporation of New York
Filed Nov. 27, 1961, Ser. No. 155,045
5 Claims. (Cl. 83—2)

This invention pertains to an apparatus for permitting escape of gases trapped within the carcass of multiple ply elastomeric articles during their manufacture, and, more particularly, to an apparatus for piercing the sidewall of a vulcanized rubber vehicle tire to a predetermined depth less than complete piercing thereof to allow the escape of air or adhesive solvent vapors trapped between adjacent plies of rubber and rubberized cord fabric during tire manufacture.

In the manufacture of vehicle tires, particularly those which are mass produced for passenger vehicle use, the problem of air or adhesive solvent vapor entrapment within the tire carcass poses a major problem. Any such gas, although originally confined in a relatively small pocket, will tend to expand due to heat buildup during high speed tire operation with resultant destructive ply separation and possible total failure of the tire.

Many expedients have been utilized in the past in attempts to facilitate escape of such gases, both during and following fabrication of the tire. Thus, during fabrication, pricked elastomeric cord fabric has been used to provide escape passages for the gases, and gas removal was also attempted by progressively stitching the plies of fabric from the central region of the carcass toward the edges of the plies. While the use of these media of gas removal are partially effective, sufficient gas frequently remain to cause an excessive number of tire defects. This is due, in part, to the fact that the pricked holes in the unvulcanized rubberized cord cabric are easily smeared over and closed during handling of the fabric, while the stitching rolls are not always applied with sufficient pressure to effectively "milk out" the gases. In addition to these expedients it therefore became necessary to pierce the sidewalls of the vulcanized tire to provide escape passages for any pockets of gas remaining in the tire or developed during curing or the operation thereof. Hand piercing with an awl has been employed for this purpose, but this is generally unsatisfactory because of the time consuming nature of the operation and the lack of the operators' control over the depth of penetration of the awl. Apparatus has been made which provides the necessary passageways by gripping a sidewall of the tire and forcing a plurality of piercing members into the sidewall, however, this requires an extra manufacturing operation further contributing to the cost of manufacture. It was therefore expedient to create an apparatus for automatically piercing the sidewalls of the tires during one of the existing manufacturing operations without the necessity for additional labor on the part of the machine operators or an extended manufacturing cycle time.

A number of operations performed upon a tire, subsequent to vulcanization, make it necessary or desirable to chuck the tire on a split rim and inflate it. For example, tires reinforced with heat shrinkable synthetic cord, such as nylon, are preferably so mounted and inflated immediately after removal from the vulcanizing mold so that they can be cooled under pressure to prevent cord shrinkage from residual vulcanization heat. Similar mounting and inflation of curced tires also facilitates the performance of tire finishing operations thereon, such as trimming of mold vent protrusions, tread lacetration, and sidewall grinding or buffing. In accordance with this invention, tire sidewall piercing may now also be effected while the tire is mounted and inflated for other finishing operations.

It is an object of this invention, therefore, to provide an apparatus for automatically piercing the sidewall of an inflated, multiple ply, annular, elastomeric article to a predetermined depth, less than that which results in complete piecing of the body of the article, to permit the escape of gases trapped within the carcass of the article.

It is another object of this invention to provide an apparatus for automatically piercing a portion of the sidewall of an inflated rubber tire to a predetermined depth, less than that which results in complete piercing of the sidewall, with the said piercing being effected simultaneously at a plurality of spaced locations.

It is a further object of this inevntion to provide an apparatus as described in the preceding paragraph to be used in combination with tire mounting and inflating apparatus wherein said first mentioned apparatus includes means to pierce the tire in response to a predetermined inflation pressure within the tire.

Further objects and advantages of the invention will be apparent from the following detailed description of a preferred embodiment thereof and from the accompanying drawing illustrating said embodiment and forming a part of this application, which drawing is a fragmentary cross-sectional view of the apparatus in its sidewall piercing position.

The illustrated embodiment of the invention operates automatically, as hereinafter described, to vent a tire sidewall by piercing it to a predetermined depth which is less than complete penetration of the sidewall. Although only one penetrating mechanism is shown for clarity of illustration, it will be readily apparent that a plurality of such mechanism are preferably utilized in circumferentially spaced relationship to simultaneously vent an entire tire sidewall.

As shown in the drawing, a vulcanized tire 10 is placed between tire gripping and inflation members 11 and 12 with the member 11 being movable toward the member 12 to securely grip the tire bead portions 13. The tire mounting members and the actuating means therefor are well known in the art and hence have been fully illustrated. After the members 11 and 12 are in their position as shown in the drawing, air is introduced into the tire through air line 14 connected to an opening 15 in the member 12. The air also flows through opening 16 in member 11 to the piercing assembly 17 which is actuated in response to a predetermined air pressure within the tire 10 to pierce the tire sidewall 18 to a depth less than complete penetration thereof.

The piercing assembly 17 comprises a flanged cylinder 19 mounted on the outer side of member 11 by means of a mounting bracket 20, which is preferably welded to both cylinder 17 and member 11. The end of cylinder 19 is drilled axially and radially providing communicating passageways 21 and 22 respectively. Passageway 22 is connected to opening 16 in member 11 by means of rigid tubing 23 having threaded nipples 24 at its connecting ends. Thus, the interior of the tire 10 is in communication with the interior of cylinder 19 at all times. Slideably mounted within cylinder 19 is a piston 25 having a fluid pressure sealing cup 26 mounted on the side thereof away from the tire 10. A piston rod 27 is mounted on the other side of piston 25 and extends from cylinder 19 toward the tire sidewall 18. Projecting from the end of piston rod 27 is the tire piercing pin 28, the diameter of which is preferably in the order of 1/16 inch, with the tire engaging end tapered to a point over a distance in the order of 5/64 inch. The piercing pin 28 may be formed alternately as a separate element removably clamped in the larger diameter piston rod 27. Mounted on a flange 29 of cylinder 19 is a cylinder cover 30 having a projecting portion 31 through a central opening 32 of which the piston rod 27 is slideable mounted. About piston rod 27 is located a spring 33 one end of which is engaged with the end of cylinder cover 30, and the other end of which is engaged with piston 25 normally urging it to its dotted line position in the drawing.

In operation of the apparatus, the operator places the vulcanized tire 10 upon gripping member 12 and by conventional means, not shown, moves gripping member 11 towards member 12 to engage the tire by its bead portions 13. As the tire 10 is engaged, air is introduced to the tire through air line 14. Air also passes through opening 16 in member 11 to the piercing assembly 17. Piston 25 does not move at once, however, due to the fact that the restraining force of spring 33 is greater than the force of the air on sealing cup 26. As the tire 10 fully rounds out and seats firmly against members 11 and 12, in response to increasing pressure within the tire, this increased pressure also acting upon piston 25 overcomes the force of spring 33. As the force of spring 33 is overcome piston 25 is moved in cylinder 19 toward the tire sidewall 18, compressing spring 33 and causing piercing pin 28 to penetrate the sidewall to a depth determined by its length, the end of piston rod 27 abutting the tire and preventing complete piercing penetration. The timing of the piercing of the side wall 18 by pin 28 relative to the time for full inflation of the tire 10 is dependent upon the compression modulus of spring 33. It has been found desirable to use a spring having a high modulus in order to have the tire sidewall 18 as firm as possible before it is pierced by pin 28, but not so high that excessive inflation pressure is necessary to fully compress the spring and overcome the resistance of the tire to penetration by the pin 28. This is also desirable where it is necessary to deflate the tire rapidly and remove it from gripping members 11 and 12 since a high modulus spring will act against piston 25 to retract pin 28 from sidewall 18 at the beginning of the deflation cycle rather than at the end.

It will be apparent that although the invention has been described with reference to but one piercing assembly several such assemblies may be arranged about gripping member 11 in circumferentially spaced relationship to operate simultaneously with one another.

Although the invention has been described with reference to one specific embodiment, it will be understood by those skilled in the art to which it pertains that modifications and refinements thereto may be made within the spirit and scope of the invention as defined in the following appended claims.

I claim:

1. An apparatus to provide passageways for the escape of gaseous materials from within the carcass of a rubber vehicle tire, comprising means to support said tire by the bead portions thereof, fluid pressure means to inflate said tire, tire piercing means movably mounted on said apparatus, means directly communicating the interior of said tire with said tire piercing means whereby fluid supplied to inflate said tire may flow to said tire piercing means to cause piercing of said tire.

2. An apparatus to provide passageways for the escape of gaseous materials from within the carcass of a rubber vehicle tire; comprising split rim members to support said tire by the bead portions thereof; fluid pressure means to inflate and deflate said tire supported by said rim members; a plurality of tire penetrating members movably mounted on said apparatus; a second fluid pressure means operable to move said penetrating members to penetrating engagement with a sidewall of said tire so supported, less than complete penetration thereof; means communicating the interior of said tire and said second fluid pressure means whereby fluid may freely flow therebetween; and spring means restraining the movement of said penetrating members toward said tire sidewalls until the pressure of the fluid within said tire rises to a predetermined pressure, and to move said penetrating members away from said penetrating engagement when the pressure of said fluid falls below said predetermined pressure.

3. An apparatus as described in claim 2, wherein said tire piercing members are mounted on at least one of said split rim members in circumferentially spaced relationship.

4. An apparatus to provide passageways for the escape of gaseous materials from within the carcass of an inflatable vehicle tire following vulcanization thereof, comprising a pair of coaxial split rim tire supporting members axially movable relative to one another, means for effecting inflation and deflation of said tire supported by said members, a plurality of tire penetrating members mounted on said apparatus for movement to and from penetrating engagement with at least one sidewall of said supported tire, fluid pressure means for simultaneous moving said penetrating members to penetrating engagement with said sidewall less than complete piercing thereof, means communicating the interior of said supported tire and said fluid pressure means whereby fluid may freely flow therebetween for direct actuation of said last mentioned means in response to said inflation, and spring means to move said penetrating members from said penetrating engagement in response to deflation of said tire.

5. An apparatus to provide passageways for the escape of gaseous materials from within the carcass of a rubber vehicle tire; comprising a pair of split rim members to support said tire by its bead portions; means whereby inflation and deflation of said supported tire may be effected; a plurality of tire piercing assemblies mounted on at least one of said rim members in circumferentially spaced relationship, said assemblies each comprising: a cylinder housing, a piston slideably mounted within said cylinder housing, fluid pressure sealing means mounted on one side of said piston, a piston rod mounted on the other side of said piston and having one end projecting through said housing toward said tire so supported, a tire piercing member mounted on the said end of said piston rod, a spring normally urging said piercing member away from said tire, and means communicating said cylinder housing with the inner face of said one rim member adjacent said tire whereby fluid may freely move therebetween to allow said tire piercing member to move toward said tire in response to inflation of said tire.

References Cited in the file of this patent

UNITED STATES PATENTS

| | | |
|---|---|---|
| 539,573 | Cartwright | May 21, 1895 |
| 2,561,012 | Clark | July 17, 1951 |
| 2,762,431 | Kuts | Sept. 11, 1956 |